(12) United States Patent  
Elliot et al.

(10) Patent No.: US 8,924,389 B2  
(45) Date of Patent: *Dec. 30, 2014

(54) COMPUTER-IMPLEMENTED SYSTEMS AND METHODS FOR COMPARING AND ASSOCIATING OBJECTS

(71) Applicant: Palantir Technologies, Inc., Palo Alto, CA (US)

(72) Inventors: Mark Elliot, Arlington, VA (US); Allen Chang, Mountain View, CA (US)

(73) Assignee: Palantir Technologies Inc., Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/140,415

(22) Filed: Dec. 24, 2013

(65) Prior Publication Data

US 2014/0280252 A1    Sep. 18, 2014

Related U.S. Application Data

(63) Continuation of application No. 14/099,661, filed on Dec. 6, 2013.

(60) Provisional application No. 61/801,297, filed on Mar. 15, 2013.

(51) Int. Cl.
  *G06F 7/00* (2006.01)
  *G06F 17/30* (2006.01)

(52) U.S. Cl.
  CPC ............................... *G06F 17/30699* (2013.01)
  USPC ........................................................ 707/737

(58) Field of Classification Search
  None
  See application file for complete search history.

(56) References Cited

U.S. PATENT DOCUMENTS 5,241,625 A    8/1993    Epard et al.
5,826,021 A    10/1998   Mastors et al.
(Continued)

FOREIGN PATENT DOCUMENTS

CN    102054015 A    5/2011
EP    1672527 A2    6/2006
(Continued)

OTHER PUBLICATIONS

Anonymous, "A Real-World Problem of Matching Records," Nov. 2006, <http://grupoweb.upf.es/bd-web/slides/ullman.pdf> (16 pages).

(Continued)

*Primary Examiner* — Uyen Le
(74) *Attorney, Agent, or Firm* — Finnegan, Henderson, Farabow, Garrett & Dunner, LLP

(57) ABSTRACT

Computer-implemented systems and methods are disclosed for comparing and associating objects. In some embodiments, a method is provided for associating a first object with one or more objects within a plurality of objects, each object comprising a first plurality of properties, each property comprising data reflecting a characteristic of an entity represented by the object, the associated objects comprising matching data in corresponding properties for a second plurality of properties. The method may include executing, for each object within the plurality of objects and for the first object, the following: creating a slug for the object, the slug comprising the second plurality of properties from the object; and inputting the slug for the object into a Bloom filter. Further, the method may include creating for a bin within the Bloom filter corresponding to the slug for the first object, an association between objects whose slugs correspond to the bin if the slugs for those objects match.

20 Claims, 4 Drawing Sheets

(56) References Cited

U.S. PATENT DOCUMENTS

| | | |
|---|---|---|
| 5,832,218 A | 11/1998 | Gibbs et al. |
| 5,845,300 A | 12/1998 | Comer |
| 5,878,434 A | 3/1999 | Draper et al. |
| 5,897,636 A | 4/1999 | Kaeser |
| 5,966,706 A | 10/1999 | Biliris et al. |
| 6,006,242 A | 12/1999 | Poole et al. |
| 6,065,026 A | 5/2000 | Cornelia et al. |
| 6,134,582 A | 10/2000 | Kennedy |
| 6,237,138 B1 | 5/2001 | Hameluck et al. |
| 6,243,706 B1 | 6/2001 | Moreau et al. |
| 6,243,717 B1 | 6/2001 | Gordon et al. |
| 6,463,404 B1 | 10/2002 | Appleby |
| 6,519,627 B1 | 2/2003 | Dan et al. |
| 6,523,019 B1 | 2/2003 | Borthwick |
| 6,944,821 B1 | 9/2005 | Bates et al. |
| 6,978,419 B1 | 12/2005 | Kantrowitz |
| 7,058,648 B1 | 6/2006 | Lightfoot et al. |
| 7,089,541 B2 | 8/2006 | Ungar |
| 7,174,377 B2 | 2/2007 | Bernard et al. |
| 7,392,254 B1 | 6/2008 | Jenkins |
| 7,403,942 B1 | 7/2008 | Bayliss |
| 7,461,158 B2 | 12/2008 | Rider et al. |
| 7,617,232 B2 | 11/2009 | Gabbert et al. |
| 7,757,220 B2 | 7/2010 | Griffith et al. |
| 7,877,421 B2 | 1/2011 | Berger et al. |
| 7,880,921 B2 | 2/2011 | Dattilo et al. |
| 7,912,842 B1 | 3/2011 | Bayliss |
| 7,941,321 B2 | 5/2011 | Greenstein et al. |
| 7,962,495 B2 | 6/2011 | Jain et al. |
| 8,036,971 B2 | 10/2011 | Aymeloglu et al. |
| 8,046,283 B2 | 10/2011 | Burns |
| 8,117,022 B2 | 2/2012 | Linker |
| 8,126,848 B2 | 2/2012 | Wagner |
| 8,232,725 B1 | 7/2012 | Wedding |
| 8,302,855 B2 | 11/2012 | Ma et al. |
| 8,364,642 B1 | 1/2013 | Garrod |
| 8,484,115 B2 | 7/2013 | Aymeloglu et al. |
| 8,554,719 B2 | 10/2013 | McGrew |
| 8,589,273 B2 | 11/2013 | Creeden et al. |
| 8,601,326 B1 | 12/2013 | Kirn |
| 8,732,574 B2 | 5/2014 | Burr et al. |
| 2002/0032677 A1 | 3/2002 | Morgenthaler et al. |
| 2002/0035590 A1 | 3/2002 | Eibach et al. |
| 2002/0095360 A1 | 7/2002 | Joao |
| 2002/0095658 A1 | 7/2002 | Shulman |
| 2002/0103705 A1 | 8/2002 | Brady |
| 2002/0147805 A1 | 10/2002 | Leshem et al. |
| 2003/0093401 A1 | 5/2003 | Czahkowski et al. |
| 2003/0105759 A1 | 6/2003 | Bess et al. |
| 2003/0115481 A1 | 6/2003 | Baird et al. |
| 2003/0177112 A1 | 9/2003 | Gardner |
| 2003/0182313 A1 | 9/2003 | Federwisch et al. |
| 2003/0212718 A1 | 11/2003 | Tester |
| 2004/0003009 A1 | 1/2004 | Wilmot |
| 2004/0006523 A1 | 1/2004 | Coker |
| 2004/0034570 A1 | 2/2004 | Davis |
| 2004/0044648 A1 | 3/2004 | Anfindsen et al. |
| 2004/0083466 A1 | 4/2004 | Dapp et al. |
| 2004/0153418 A1 | 8/2004 | Hanweck |
| 2004/0153451 A1 | 8/2004 | Phillips et al. |
| 2004/0205492 A1 | 10/2004 | Newsome |
| 2004/0210763 A1 | 10/2004 | Jonas |
| 2005/0010472 A1 | 1/2005 | Quatse et al. |
| 2005/0039116 A1 | 2/2005 | Slack-Smith |
| 2005/0086207 A1 | 4/2005 | Heuer et al. |
| 2005/0091186 A1 | 4/2005 | Elish |
| 2005/0097441 A1 | 5/2005 | Herbach et al. |
| 2005/0262493 A1 | 11/2005 | Schmidt et al. |
| 2005/0262512 A1 | 11/2005 | Schmidt et al. |
| 2006/0010130 A1 | 1/2006 | Leff et al. |
| 2006/0026561 A1 | 2/2006 | Bauman et al. |
| 2006/0031779 A1 | 2/2006 | Theurer et al. |
| 2006/0053170 A1 | 3/2006 | Hill et al. |
| 2006/0080316 A1 | 4/2006 | Gilmore et al. |
| 2006/0136513 A1 | 6/2006 | Ngo et al. |
| 2006/0143075 A1 | 6/2006 | Carr et al. |
| 2006/0218206 A1 | 9/2006 | Bourbonnais et al. |
| 2006/0218491 A1 | 9/2006 | Grossman et al. |
| 2006/0253502 A1 | 11/2006 | Raman et al. |
| 2006/0265417 A1 | 11/2006 | Amato et al. |
| 2006/0277460 A1 | 12/2006 | Forstall et al. |
| 2007/0000999 A1 | 1/2007 | Kubo et al. |
| 2007/0011304 A1 | 1/2007 | Error |
| 2007/0061752 A1 | 3/2007 | Cory |
| 2007/0067285 A1 | 3/2007 | Blume et al. |
| 2007/0233756 A1 | 10/2007 | D'Souza et al. |
| 2007/0245339 A1 | 10/2007 | Bauman et al. |
| 2007/0271317 A1 | 11/2007 | Carmel |
| 2007/0284433 A1 | 12/2007 | Domenica et al. |
| 2007/0299697 A1 | 12/2007 | Friedlander et al. |
| 2008/0005063 A1 | 1/2008 | Seeds |
| 2008/0016155 A1 | 1/2008 | Khalatian |
| 2008/0069081 A1 | 3/2008 | Chand et al. |
| 2008/0109714 A1 | 5/2008 | Kumar et al. |
| 2008/0140387 A1 | 6/2008 | Linker |
| 2008/0195672 A1 | 8/2008 | Hamel et al. |
| 2008/0222295 A1 | 9/2008 | Robinson et al. |
| 2008/0228467 A1 | 9/2008 | Womack et al. |
| 2008/0243711 A1 | 10/2008 | Aymeloglu et al. |
| 2008/0270316 A1 | 10/2008 | Guidotti et al. |
| 2008/0281580 A1 | 11/2008 | Zabokritski |
| 2008/0313132 A1* | 12/2008 | Hao et al. .................. 707/2 |
| 2009/0076845 A1 | 3/2009 | Bellin et al. |
| 2009/0089651 A1 | 4/2009 | Herberger et al. |
| 2009/0094166 A1 | 4/2009 | Aymeloglu et al. |
| 2009/0106178 A1 | 4/2009 | Chu |
| 2009/0106242 A1 | 4/2009 | McGrew |
| 2009/0112745 A1 | 4/2009 | Stefanescu |
| 2009/0150868 A1 | 6/2009 | Chakra et al. |
| 2009/0164387 A1 | 6/2009 | Armstrong et al. |
| 2009/0187546 A1 | 7/2009 | Whyte et al. |
| 2009/0187548 A1 | 7/2009 | Ji et al. |
| 2009/0199106 A1 | 8/2009 | Jonsson et al. |
| 2009/0228507 A1 | 9/2009 | Jain et al. |
| 2009/0271343 A1 | 10/2009 | Vaiciulis et al. |
| 2009/0313311 A1 | 12/2009 | Hoffmann et al. |
| 2009/0319418 A1 | 12/2009 | Herz |
| 2010/0042922 A1 | 2/2010 | Bradateanu et al. |
| 2010/0057622 A1 | 3/2010 | Faith et al. |
| 2010/0070531 A1 | 3/2010 | Aymeloglu et al. |
| 2010/0070842 A1 | 3/2010 | Aymeloglu et al. |
| 2010/0082541 A1 | 4/2010 | Kottomtharayil |
| 2010/0098318 A1* | 4/2010 | Anderson .................. 382/137 |
| 2010/0114817 A1 | 5/2010 | Broeder et al. |
| 2010/0114831 A1 | 5/2010 | Gilbert et al. |
| 2010/0145909 A1 | 6/2010 | Ngo |
| 2010/0204983 A1 | 8/2010 | Chung et al. |
| 2010/0223260 A1 | 9/2010 | Wu |
| 2010/0306285 A1 | 12/2010 | Shah et al. |
| 2011/0061013 A1 | 3/2011 | Bilicki et al. |
| 2011/0099133 A1 | 4/2011 | Chang et al. |
| 2011/0225482 A1 | 9/2011 | Chan et al. |
| 2011/0258216 A1 | 10/2011 | Supakkul et al. |
| 2012/0013684 A1 | 1/2012 | Robertson et al. |
| 2012/0066166 A1 | 3/2012 | Curbera et al. |
| 2012/0079363 A1 | 3/2012 | Folting et al. |
| 2012/0191446 A1 | 7/2012 | Binsztok et al. |
| 2012/0323888 A1 | 12/2012 | Osann, Jr. |
| 2013/0055264 A1 | 2/2013 | Burr et al. |
| 2013/0124193 A1 | 5/2013 | Holmberg |
| 2013/0132348 A1 | 5/2013 | Garrod |
| 2013/0151453 A1 | 6/2013 | Bhanot et al. |
| 2013/0166480 A1 | 6/2013 | Popescu et al. |
| 2013/0238616 A1 | 9/2013 | Rose et al. |
| 2013/0282696 A1 | 10/2013 | John et al. |
| 2013/0290825 A1 | 10/2013 | Arndt et al. |
| 2013/0297619 A1 | 11/2013 | Chandrasekaran et al. |
| 2014/0006404 A1 | 1/2014 | McGrew et al. |
| 2014/0012796 A1 | 1/2014 | Petersen et al. |
| 2014/0068487 A1 | 3/2014 | Steiger et al. |
| 2014/0108380 A1 | 4/2014 | Gotz et al. |
| 2014/0108985 A1 | 4/2014 | Scott et al. |

(56) References Cited

U.S. PATENT DOCUMENTS

| | | | |
|---|---|---|---|
| 2014/0129936 | A1 | 5/2014 | Richards |
| 2014/0157172 | A1 | 6/2014 | Peery et al. |
| 2014/0195515 | A1 | 7/2014 | Baker et al. |

FOREIGN PATENT DOCUMENTS

| | | |
|---|---|---|
| GB | 2366498 A | 3/2002 |
| WO | WO 01/25906 A1 | 4/2001 |
| WO | 2009/051987 | 4/2009 |
| WO | 2010/030919 | 3/2010 |
| WO | WO 2010/030911 A2 | 3/2010 |
| WO | WO 2010/030914 A2 | 3/2010 |
| WO | WO 2012/119008 A2 | 9/2012 |

OTHER PUBLICATIONS

Appacts, "Smart Thinking for Super Apps,", http://www.appacts.com, accessed online on Jul. 18, 2013 (4 pages).
Apsalar, "Data Powered Mobile Advertising," "Free Mobile App Analytics" and various analytics related screen shots, http://apsalar.com, accessed online on Jul. 18, 2013 (8 pages).
Capptain—Pilot Your Apps, <http://www.capptain.com, accessed online on Jul. 18, 2013 (6 pages).
Countly Mobile Analytics, <http://count.ly/>, accessed online on Jul. 18, 2013 (9 pages).
Distimo—App Analytics, <http://www.distimo.com/app-analytics>, accessed online on Jul. 18, 2013 (5 pages).
Flurry Analytics, <http://www.flurry.com/>, accessed online on Jul. 18, 2013 (14 pages).
Google Analytics Official Website—Web Analytics & Reporting, <http://www.google.com/analytics.index.html>, accessed online on Jul. 18, 2013 (22 pages).
Kontagent Mobile Analytics, <http://www.kontagent.com/>, accessed online on Jul. 18, 2013 (9 pages).
Localytics—Mobile App Marketing & Analytics, <http://www.localytics.com/>, accessed online on Jul. 18, 2013 (12 pages).
Mixpanel—Mobile Analytics, <https://mixpanel.com/>, accessed online on Jul. 18, 2013 (13 pages).
Open Web Analytics (OWA), <http://www.openwebanalytics.com/>, accessed online on Jul. 19, 2013 (5 pages).
Piwik—Free Web Analytics Software, <http://piwik.org/>, accessed online on Jul. 19, 2013 (18 pages).
StatCounter—Free Invisible Web Tracker, Hit Counter and Web Stats, <http://statcounter.com/>, accessed online on Jul. 19, 2013 (17 pages).
TestFlight—Beta Testing on the Fly, <http://testflightapp.com/>, accessed online on Jul. 18, 2013 (3 pages).
Trak.io, <http://trak.io/>, accessed online on Jul. 18, 2013 (3 pages).
UserMetrix, <http://usermetrix.com/android-analytics/>, accessed online on Jul. 18, 2013 (3 pages).
Anonymous, "BackTult—JD Edwards One World Version Control System," printed Jul. 23, 2007 (1 page).
Lim et al., "Resolving Attribute Incompatibility in Database Integration: An Evidential Reasoning Approach," Department of Computer Science, University of Minnesota, <http://reference.kfupm.edu.sa/content/r/e/resolving_attribute_incompatibility_in_d_531691.pdf>, pp. 154-163.
Litwin et al., "Multidatabase Interoperability," IEEE Computer, Dec. 1986, vol. 19, No. 12, pp. 10-18. <http://www.lamsade.dauphine.fr/~litwin/mdb-interoperability.pdf>.
Qiang et al., "A Mutual-Information-Based Approach to Entity Reconciliation in Heterogeneous Databases," Proceedings of 2008 International Conference on Computer Science & Software Engineering, IEEE Computer Society, New York, NY, Dec. 12-14, 2008, pp. 666-669.
Zhao et al., "Entity Matching Across Heterogeneous Data Sources: An Approach Based on Constrained Cascade Generalization," Data & Knowledge Engineering, vol. 66, No. 3, Sep. 2008, pp. 368-381.
First Examination Report dated Mar. 27, 2014, issued in New Zealand Application No. 622473 (3 pages).
Further Examination Report dated Jun. 19, 2014, issued in New Zealand Application No. 622473 (2 pages).
Hua et al., "A Multi-attribute Data Structure with Parallel Bloom Filters for Network Services", published in "High Performance Computing—HiPC 2006; 13th International Conference", Bangalore, India, Dec. 18-21, 2006, pp. 277-288.
First Examination Report dated Apr. 1, 2014, issued in New Zealand Application No. 622476 (2 pages).
Further Examination Report dated Jun. 19, 2014, issued in New Zealand Application No. 622476 (2 pages).
"A Tour of Pinboard," <http://pinboard.in/tour> printed on May 15, 2014 (6 pages).
Delicious, <http://delicious.com/> printed on May 15, 2014 (1 page).
Gu et al., "Record Linkage: Current Practice and Future Directions," Jan. 15, 2004 (32 pages).
Nadeau et al., "A Survey of Named Entity Recognition and Classification," Jan. 15, 2004 (20 pages).
Nin et al., "On the Use of Semantic Blocking Techniques for Data Cleansing and Integration," 11th International Database Engineering and Applications Symposium, 2007 (9 pages).
Sekine et al., "Definition, Dictionaries and Tagger for Extended Named Entity Hierarchy," May 2004, pp. 1977-1980.
Extended European Search Report dated Jun. 6, 2012, issued in European Application No. EP08730336.8.
PCT International Search Report dated Dec. 5, 2008, issued in International Application No. PCT/US2008/079072 (1 page).
PCT International Preliminary Report on Patentability and Written Opinion dated Apr. 20, 2010, issued in International Application No. PCT/US2008/079072 (6 pages).
Final Office Action dated Feb. 13, 2012, issued in U.S. Appl. No. 12/556,307 (27 pages).
Office Action dated Oct. 1, 2013, issued in U.S. Appl. No. 12/556,307 (24 pages).
Extended European Search Report dated Apr. 3, 2014, issued in European Application No. EP 09813700.3 (9 pages).
PCT International Search Report mailed Apr. 20, 2010, in International Application No. PCT/US2009/056709 (3 pages).
PCT International Preliminary Report on Patentability and Written Opinion mailed Mar. 24, 2011, in International Application No. PCT/US2009/056709 (6 pages).
Extended European Search Report dated Aug. 14, 2012, issued in European Application No. EP 08839003.4 (9 pages).
European Examination Report dated Jun. 12, 2013, issued in European Application No. EP 08839003.4 (6 pages).
First Examination Report dated Mar. 20, 2014, issued in New Zealand Application No. 622389 (2 pages).
First Examination Report dated Mar. 20, 2014, issued in New Zealand Application No. 622404 (2 pages).
First Examination Report dated Apr. 2, 2014, issued in New Zealand Application No. 622484 (2 pages).
Keylines.com, "An Introduction to KeyLines and Network Visualization," Mar. 2014, <http://keylines.com/wp-content/uploads/2014/03/KeyLines-White-Paper.pdf> downloaded on May 12, 2014 (8 pages).
Keylines.com, "KeyLines Datasheet," Mar. 2014, <http://keylines.com/wp-content/uploads/2014/03/KeyLines-datasheet.pdf> downloaded on May 12, 2014 (2 pages).
Keylines.com, "Visualizing Threats: Improved Cyber Security Through Network Visualization," Apr. 2014, <http://keylines.com/wp-content/uploads/2014/04/Visualizing-Threats1.pdf> downloaded on May 12, 2014 (10 pages).
Manno et al., "Introducing Collaboration in Single-user Applications through the Centralized Control Architecture," 2010 (10 pages).
Vose et al., "Help File for ModelRisk Version 5," 2007, Vose Software, pp. 349-353. Parts 1 and 2 (total 357 pages).
Bluttman et al., "Excel Formulas and Functions for Dummies," 2005, Wiley Publishing, Inc., pp. 280, 284-286.
Galliford, Miles, "SnagIt Versus Free Screen Capture Software: Critical Tools for Website Owners," <http:www.subhub.com/articles/free-screen-capture-software>, Mar. 27, 2008 (11 pages).
"GrabUp—What a Timesaver!" <http://atlchris.com/191/grabup/>, Aug. 11, 2008 (3 pages).

(56) References Cited

OTHER PUBLICATIONS

JetScreenshot.com, "Share Screenshots via Internet in Seconds," <http://web.archive.org/web/20130807164204/http://www.jetscreenshot.com/>, Aug. 7, 2013 (1 page).
Kwout, <http://web.archive.org/web/20080905132448/http://www.kwout.com/> Sep. 5, 2008 (2 pages).
Microsoft, "Registering an Application to a URI Scheme," <http://msdn.microsoft.com/en-us/library/aa767914.aspx>, printed Apr. 4, 2009 (4 pages).
Microsoft, "Using the Clipboard," <http://msdn.microsoft.com/en-us/library/ms649016.aspx>, printed Jun. 8, 2009 (20 pages).
Nitro, "Trick: How to Capture a Screenshot As PDF, Annotate, Then Share It," <http://blog.nitropdf.com/2008/03/04/trick-how-to-capture-a-screenshot-as-pdf-annotate-it-then-share/>, Mar. 4, 2008 (2 pages).
Online Tech Tips, "Clip2Net—Share files, folders and screenshots easily," <http://www.online-tech-tips.com/free-software-downloads/share-files-folders-screenshots/>, Apr. 2, 2008 (5 pages).
O'Reilly.com, <http://oreilly.com/digitalmedia/2006/01/01/mac-os-x-screenshot-secrets.html> published Jan. 1, 2006 (10 pages).
Schroder, Stan, "15 Ways to Create Website Screenshots," <http://mashable.com/2007/08/24/web-screenshots/>, Aug. 24, 2007 (2 pages).
Warren, Christina, "TUAW Faceoff: Screenshot apps on the firing line," <http://www.tuaw.com/2008/05/05/tuaw-faceoff-screenshot-apps-on-the-firing-line/>, May 5, 2008 (11 pages).
Extended European Search Report dated Apr. 8, 2014, issued in European Application No. EP09813693.0 (5 pages).
PCT International Search Report mailed Apr. 19, 2010, issued in International Application No. PCT/US2009/056700 (3 pages).
PCT International Preliminary Report on Patentability and Written Opinion mailed Mar. 24, 2011, issued in International Application No. PCT/US2009/056700 (5 pages).
Extended European Search Report dated Apr. 9, 2014, issued in European Application No. EP09813696.3 (6 pages).
PCT International Search Report mailed Apr. 1, 2010, issued in International Application No. PCT/US2009/056704 (3 pages).
PCT International Preliminary Report on Patentability and Written Opinion mailed Mar. 24, 2011, issued in International Application No. PCT/US2009/056704 (6 pages).
UK Search Report dated Apr. 14, 2014, issued in Application No. GB 1319502.9 (3 pages).
First Examination Report dated Nov. 13, 2013, issued in New Zealand Application No. 617128 (2 pages).
Extended European Search Report dated Jun. 3, 2014, issued in European Application No. 14158958.0 (11 pages).
Extended European Search Report dated Jun. 10, 2014, issued in European Application No. 14158977.0 (10 pages).
Johnson, Maggie, "Introduction to yacc and bison", Handout 13, Jul. 8, 2005, pp. 1-11, retrieved from the internet: http://staff.science.uva.nl/~andy/compiler/yacc-intro.pdf on May 5, 2014.
First Examination Report dated Mar. 24, 2014, issued in New Zealand Application No. 622439 (2 pages).
Further Examination Report dated Jun. 6, 2014, issued in New Zealand Application No. 622439 (2 pages).
Hansen et al., "Analyzing Social Media Networks with NodeXL: Insights from a Connected World", Elsevier Science, Sep. 2010, pp. 53-67 and 143-164.
British Combined Search and Examination Report dated Aug. 20, 2014, issued in British Application No. GB1404499.4, (6 pages).
British Combined Search and Examination Report dated Aug. 27, 2014, issued in British Application No. GB1404486.1, (5 pages).
British Combined Search and Examination Report dated Aug. 27, 2014, issued in British Application No. GB1404489.5, (5 pages).

\* cited by examiner

COMPUTER-IMPLEMENTED SYSTEMS AND METHODS FOR COMPARING AND ASSOCIATING OBJECTS

REFERENCE TO RELATED APPLICATIONS

This application is a continuation of U.S. Non-Provisional application Ser. No. 14/099,661, filed on Dec. 6, 2013, which claims the benefit of priority to U.S. Provisional Patent Application No. 61/801,297, filed on Mar. 15, 2013, both of which are expressly incorporated herein by reference in their entireties.

BACKGROUND

Numerous organizations, including industry and government entities, recognize that important conclusions can be drawn if massive data sets can be analyzed to identify patterns of behavior that suggest dangers to public safety or evidence illegality. These analyses often involve matching data associated with a person or thing of interest with other data associated with the same person or thing to determine that the same person or thing has been involved in multiple acts that raise safety or criminal concerns.

Yet, the quality of the analytical result arising from use of sophisticated analytical tools can be limited by the quality of data the tool utilizes. For certain types of analyses, an acceptable error rate must be literally or nearly zero for an analytical conclusion drawn from the data to be sound. Achieving this zero or near-zero error rate for datasets comprising tens or hundreds of millions of records can be problematic. Present data comparison tools are not well suited to solve these issues.

The issues discussed above are particularly acute for analyses involving data related to identifying persons or things for inquiries relating to public safety. For example, analytical tools for identifying potential safety threats generally do not have an acceptable error rate greater than zero because the cost of mistakenly identifying the presence of a safety threat (i.e., a "false positive") or allowing a safety threat to go undetected (i.e., a "false negative") is unacceptably high. Therefore, tools supporting public safety must correctly relate data associated with persons or things of interest with other data related to the same person or thing.

Some tools exist for accurately comparing data, but they are computationally impractical to use with datasets containing millions of records. For example, one solution to determining whether two particular objects are associated with the same person or thing of interest is to compare each element of one object to a corresponding element in the second object. For example, for objects containing M elements, a first element in the first object may be compared to a corresponding first element in the second object, and corresponding comparisons may be made for each of the remaining M−1 elements common to the first and second objects. If the elements within each object are collectively adequate to uniquely identify the represented person or thing with certainty, and corresponding elements within the first and second objects match, a conclusion may reasonably be drawn that the objects reflect the same person or thing. As an alternative, each object could be converted (serialized) into a single string reflecting the contents of each element to be compared. Thereafter, a string generated from one object could be compared to a string generated from another object as a form of object comparison.

For certain datasets, the above approaches may consume little memory or system resources, because the objects or their serialized strings can be stored on disk rather than in main memory. However, the above approaches may quickly become impractical with large or non-trivial datasets. As the number of objects to compare increases, the number of comparisons and thus the processing time of the comparisons increases exponentially; i.e., proportional to $n^2/2$, where n represents the number of objects to be compared. Thus, a comparison of 500 objects using a serialized approach, whose processing time may be approximated as the time to perform 125,000 string comparisons, may be computationally tractable. However, a comparison of 100 million (100 M) records using that approach, whose processing time may be approximated as the time to perform 5 quadrillion (5e15) string comparisons, may be computationally intractable. Additionally, reading strings from disk rather than reading them from memory may add additional processing time.

Another solution for identifying matching objects within a corpus of objects is to store each object in a multimap. This multimap is an associative array that stores multiple values for each key. Importing the objects into the multimap leads to objects with the same element data being stored in a single entry of the multimap. Thus, use of a multimap associates identical objects.

One drawback to using a multimap for object comparisons is that the multimap is typically stored in main memory, due to algorithmic considerations related to key organization within the multimap, so an object comparator must have sufficient main memory to hold a multimap comprising the entire corpus in memory. Therefore, a multimap solution can be impractical for datasets at or above 100 M objects. Similar drawbacks exist to each approach as applied to other object comparison problems, such as efficiently identifying unique objects within a corpus of objects and efficiently comparing a single object to all objects within a corpus of object.

Neither solution is viable for datasets approaching or exceeding 100 M objects. Yet, object datasets comprising 100 M or more objects are not uncommon today. Therefore, the problems described above are quite real and a need exists for improved object comparators.

BRIEF DESCRIPTION OF THE DRAWINGS

Reference will now be made to the accompanying drawings showing example embodiments of the present application, and in which.

DETAILED DESCRIPTION OF EXEMPLARY EMBODIMENTS

Figure 1:
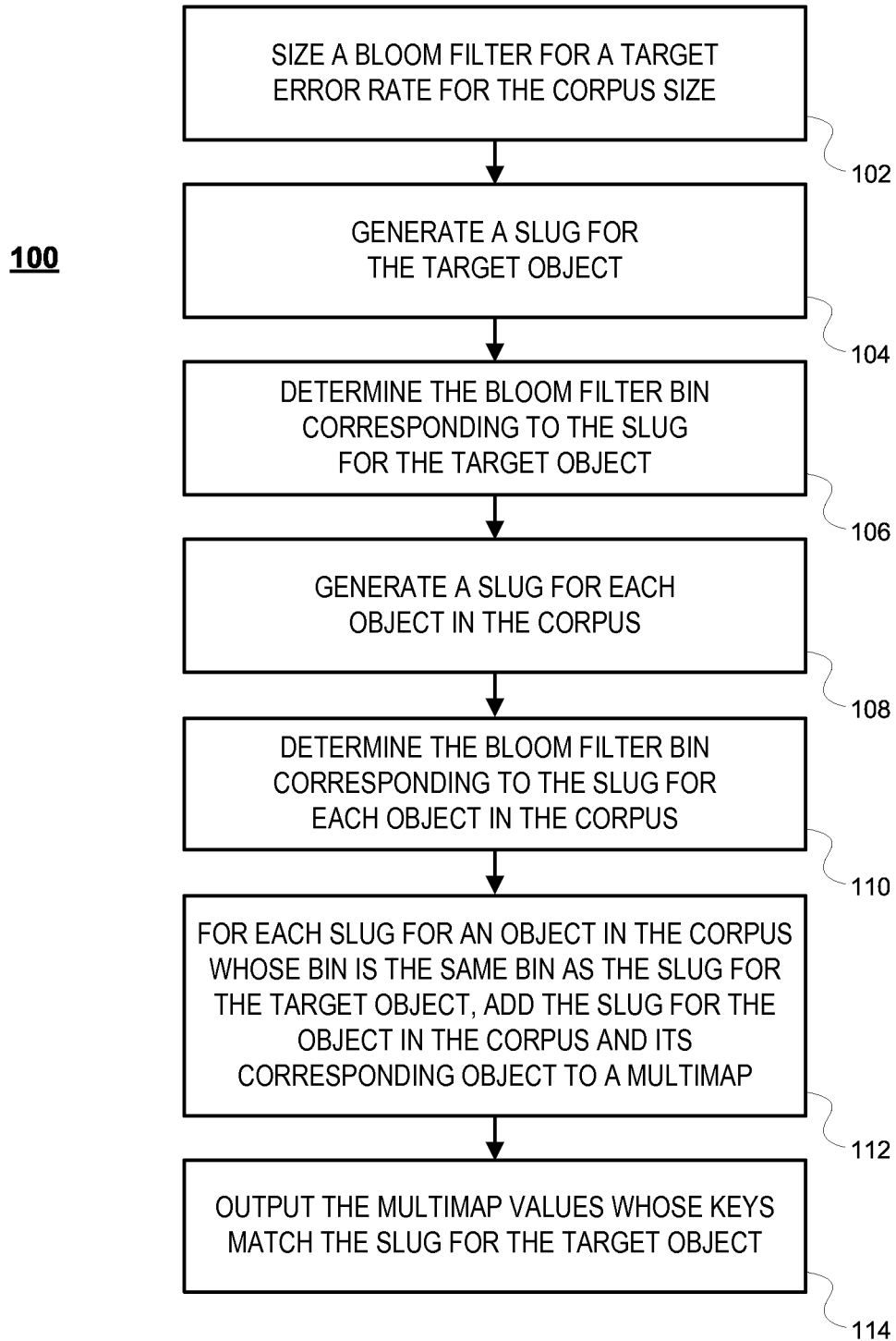
FIG. 1 illustrates a flowchart of an exemplary process for comparing a target object to at least some objects in a corpus, consistent with some embodiments of the present disclosure.

Reference will now be made in detail to the embodiments, examples of which are illustrated in the accompanying drawings. Whenever possible, consistent reference numbers will be used throughout the drawings to refer to the same or like parts.

Embodiments of the present disclosure can avoid the shortcomings of traditional object comparators by providing computer-implemented systems and methods for comparing objects in a way that allows for greater computational throughput and acceptable memory consumption without a reduction in comparison accuracy and for dataset sizes that were previously impractical or impossible at acceptable levels of computational throughput.

Embodiments of the present disclosure address a class of computational problems related to object comparison. One member of this class involves efficient object comparison of a particular object to a corpus of objects. Another member of this class involves efficient comparison of each object in a corpus to all other objects in the corpus. An additional member of this class involves efficient identification of unique objects within a corpus of objects.

The following detailed description begins with a general overview of object comparison. Some examples of objects to be compared or analyzed are provided. The description then explains an exemplary embodiment that addresses the first class of problem discussed above (i.e., efficiently comparing one object to all objects in a corpus). The description then expands the solution to the first class of problem to address the second class of problem discussed above (i.e., efficient comparison of each object in a corpus to all other objects in the corpus). The detailed description then discloses a solution to the third class of problem (i.e., efficient identification of unique objects within a corpus of objects). An introduction to objects and an overview of object comparison follows.

Several types of objects exist within the field of computer science. One type of object that is well known within the field of computer science is an object in the object-oriented sense. Wikipedia describes an object of this type as a set of elements (i.e., data structures) and methods, which are similar to functions. Without necessarily endorsing that rather simplistic description, embodiments implementing the object comparison solutions discussed herein are compatible with comparing objects of this type.

Another type of object within the field of computer science field is a data structure that reflects the properties of a person or thing relevant to a particular task or data processing environment. In some embodiments, these properties are reflected by strings. In other embodiments, properties may be reflected by strings, integers, real numbers, times or dates, binary values, structures in the C programming sense, enumerated variables, and/or other forms of data. In some embodiments, properties within either type of object may be converted to strings prior to comparison. In other embodiments, some properties may be strings or may be converted to strings while other properties may not be strings and may not be converted to strings. The embodiments of the present disclosure may operate on string or non-string properties.

Moreover, the notion of a "data structure" is very flexible in this context. The term "data structure" can reflect any type of structured data, from information stored in a database (with table columns reflecting elements within an object or data structure and table rows reflecting instances of the object or data structure) to formatted text in a text file (such as data within an XML structure) to data stored within an executing computer program. Accordingly, because a data structure broadly encompasses the types of structured data described above, objects also broadly encompass these types of structured data. Moreover, the object comparison solutions discussed herein are also compatible with comparing objects of these types.

In some embodiments, effective object comparison involves considering which properties of the objects to be compared are relevant to performing the comparison because the entities (e.g., persons or things) reflected by those objects may have different relevant properties in different environments. For example, an object can store properties of an automobile that may be relevant to a state's motor vehicle department by storing the following information: vehicle identification number (VIN), year of manufacture, make, model, expiration date of the vehicle's registration, and a direct or indirect indication of the person that owns the vehicle.

For automobiles being sold on an auction website such as eBay, however, the relevant properties of an automobile may differ from those relevant to the state's motor vehicle department. For example, a data structure for storing properties of an automobile listed for sale on eBay may include: VIN, year, make, model, odometer reading, condition of the automobile, minimum auction bid, and a direct or indirect indication of the person listing the vehicle for sale. Thus, properties of an entity (e.g., a person or thing) relevant to one environment may differ from properties of the entity relevant to another environment. Accordingly, an object's properties considered during object comparison in one environment may differ from those considered during object comparison in a second environment.

In some embodiments, effective data comparison may also involve considering which properties tend to distinguish an entity (e.g., a person or thing) from other instances of the entity. For example, a VIN for an automobile should by design be unique to that automobile. However, occasional situations may arise where a VIN is not unique to a particular automobile. Such situations may arise from intentional errors or accidental errors. An example of an intentional error is attempting fraudulent registration of a stolen vehicle under an assumed VIN. An example of an accidental error occurs when a smog check worker incorrectly enters a VIN into a computer at a smog check station, which leads to a smog check record with an incorrect VIN subsequently being communicated to a state database. Data errors exist in real world data processing environments, so some embodiments of the present disclosure minimize or eliminate errors by identifying objects through a combination of several object properties rather than identifying objects through use of a single object property.

In some embodiments, one or more identifying properties of an object are extracted from the object and stored in a data structure. This data structure is referred to as a "slug"; it contains information that may be sufficient to uniquely identify an entity (e.g., a person or thing) with some degree of information redundancy to allow for detecting errors in the properties within the slug. In some embodiments, the slug comprises a concatenation of strings separated by a delimiter character. In some embodiments, the delimiter character is a NULL character while in other embodiments the delimiter character may be a character not otherwise present in the concatenated string. In some embodiments, the concatenated strings may be delimited by a delimiter string (e.g., "-") rather than a delimiter character. In embodiments employing a delimiter string, the delimiter string may be any string that is not otherwise present in the strings that were concatenated. In other embodiments, the slug comprises a data structure such as an object, array, structure, or associative array.

For example, in one embodiment, slug for an automobile may contain properties reflecting a VIN, make, model, and year for the automobile. Inclusion of make, model, and year properties for the automobile within the slug provides a capability for detecting errors in the VIN property because the VIN property is not the only object property being compared. For slugs associated with two automobiles to match in the presence of an error in the VIN property of one automobile object, an automobile object with the same VIN property as the erroneous VIN must also have the same make, model, and year properties.

The odds of this coincidental match of multiple properties between two or more objects may be fleetingly low. Therefore, inclusion of some degree of information redundancy should avoid or at least substantially reduce erroneous object comparison matches relative to object comparisons only comparing a single property between objects notwithstanding that the single property was intended to uniquely identify its corresponding entity (e.g., person or thing).

Exemplary embodiments will now be described that solve the first problem discussed above, i.e., efficiently comparing a particular object (hereinafter a "target object") to all objects in a corpus. The disclosed embodiments utilize a Bloom filter to identify slugs associated with objects in the corpus that do not match the slug for the target object. This quick recognition is performed by discarding slugs that are associated with a different bin in the Bloom filter than the bin associated with the slug for the target object.

Bloom filters have the property that two slugs falling into different bins within the Bloom filter are certain to have different properties and thus reflect different objects. Therefore, if the slug for the target object does not fall into the same bin as the slug for a particular object in the corpus, the target object does not match the particular object in the corpus and may thus be removed from future consideration in such embodiments.

FIG. 1 illustrates a flowchart of an exemplary process 100 for comparing a target object to at least some objects in a corpus, consistent with some embodiments of the present disclosure. In some embodiments, the target object to be compared to at least some objects in the corpus is a member of the corpus. In these embodiments, a comparison between the target object and all other objects in the corpus is performed. In other embodiments, the object to be compared to at least some objects in the corpus is not a member of the corpus. In these other embodiments, a comparison between the target object and all objects in the corpus is performed.

As illustrated, in step 102, a Bloom filter is sized and created with consideration for the error rate that will result for the corpus size that is being processed. For example, increasing the number of bins in a Bloom filter may tend to decrease the error rate for a specific corpus size while reducing the number of bins in a Bloom filter may tend to increase the error rate for a specific corpus size. Techniques for sizing a Bloom filter to achieve a target error rate for a specific corpus size are well known in the art, so these techniques are not discussed herein.

In step 104, a slug for the target object (i.e., the object against which all objects in the corpus will be compared) is generated. Considerations for selecting which properties of an object to include in a slug were discussed above. In step 106, a Bloom filter bin corresponding to the slug for the target object is determined. In some embodiments, a Bloom filter bin for a slug may be determined by inputting the slug to a Bloom filter and directing the Bloom filter to disclose the bin into which the slug was added.

In other embodiments, a Bloom filter bin for a slug may be determined by presenting the slug as a input to a software function associated with the Bloom filter without storing the slug in the Bloom filter. In additional embodiments, a bin for a slug may be determined by inputting the slug into a software function reflecting a bin selection algorithm for a Bloom filter in the absence of using an actual and/or complete Bloom filter and receiving the Bloom filter bin as an output of that software function. In other embodiments, other approaches to yielding a Bloom filter bin from a slug may be utilized. These approaches for identifying a Bloom filter bin for a slug, consistent with the embodiments discussed above, are collectively referred to in steps 106, 108. The determined Bloom filter bin will be utilized to identify slug comparison matches, some of which may be "false positives", using the Bloom filter as discussed below.

In step 108, a slug for each object in the corpus is generated. In step 110, a Bloom filter bin for each object in the corpus is determined. In some embodiments, a Bloom filter bin for an object may be determined by inputting the object's slug into the Bloom filter and directing the Bloom filter to disclose the bin into which the slug was added.

After completion of step 110, slugs corresponding to the bin identified in step 108 reflect matches with the slug for the target object. Some of these matches, however, may be false positive matches rather than true matches. Therefore, steps 112 and 114 filter out the false positive matches through use of a multimap.

In step 112, for each slug corresponding to an object in the corpus whose bin in the Bloom filter is the same bin as the slug for the target object, the slug corresponding to an object in the corpus and its corresponding object in the corpus is added to a multimap. When adding the slug and its corresponding object to the multimap, the slug represents the key to the multimap and the object in the corpus represents the value to the multimap. This multimap will be utilized to remove false positives from processing. In step 114, the process concludes by selecting the true positive matches identified in the multimap. These non-false positive matches can be retrieved from the multimap by reading data from the multimap with the slug for the target object as a key.

In some embodiments, process 100 may be distributed across multiple processors. For example, a Bloom filter may exist on each of several processors and steps 102 through 114 can be executed on each of the several processors. The corpus of objects may be distributed among the various processors so that all objects are processed by one processor, but no object is processed by more than one processor. In such embodiments, each of the multiple processors outputs a portion of the objects in the corpus that match the target object.

Exemplary embodiments will now be described that solve the second problem discussed above, i.e., efficiently comparing all objects to all objects in a corpus. These embodiments utilize a counting Bloom filter to quickly identify slugs associated with objects in the corpus that do not match the slug for the target object. Counting Bloom filters are well known in the art, so their structure and construction are not discussed herein.

In particular, if a bin in the counting Bloom filter has a value of zero or one after slugs for all of the objects in the corpus have been input to the Bloom filter, no object whose slug is associated with that bin could match another slug, so these slugs are removed from further consideration. These slugs can be removed because those skilled in the art will recognize that Bloom filters can have false positives but they cannot have false negatives. Therefore, a counting Bloom filter bin whose count is less than two reflects an accurate determination that no match exists between slugs associated with that bin because any match would create a count of at least two. However, false positive may exist among objects whose slugs are associated with the same Bloom filter bin, so false positives may be removed through additional processing, as discussed below.

Figure 2:
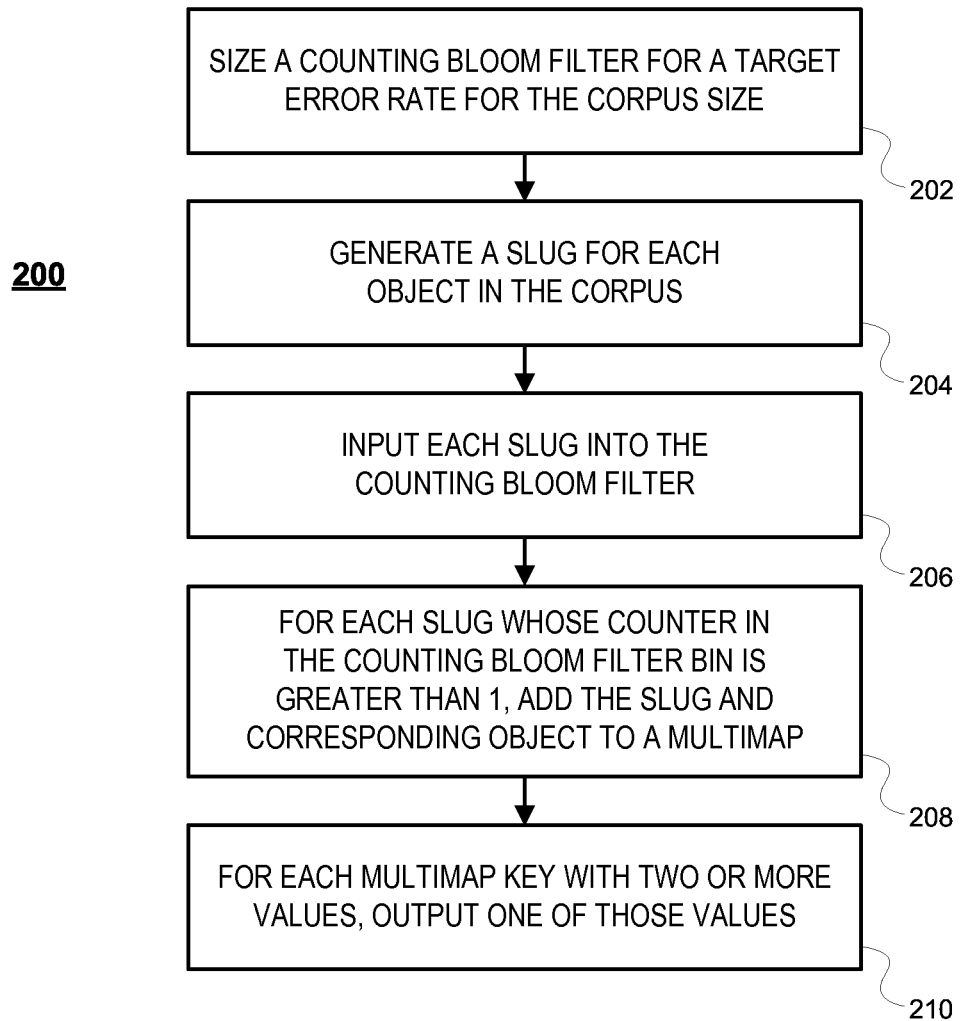
FIG. 2 illustrates a flowchart of an exemplary process for comparing all objects in a corpus to all other objects in the corpus, to determine matches within the corpus, consistent with some embodiments of the present disclosure.

FIG. 2 illustrates a flowchart of an exemplary process 200 for comparing all objects in a corpus to all other objects in the corpus, to determine matches within the corpus, consistent with some embodiments of the present disclosure. As illustrated, in step 202, a counting Bloom filter is sized and created with consideration for the error rate that will result for the corpus size that is being processed. For example, increasing the number of bins in a counting Bloom filter may tend to decrease the error rate for a specific corpus size while reducing the number of bins in a counting Bloom filter may tend to increase the error rate for a specific corpus size. Techniques for sizing a counting Bloom filter to achieve a target error rate for a specific corpus size are well known in the art, so these techniques are not discussed herein.

In some embodiments, the counting Bloom filter may comprise an N-bit counter and these counters may be implemented as two-bit counters (i.e., N=2). In other embodiments, these counters may be one-bit counters or counters of more than two bits. In additional embodiments, these counters are saturation counters; i.e., these counters will count up to a maximum value and then not exceed that value.

In step 204, a slug for each object in the corpus is generated. In step 206, each slug is input to the counting Bloom filter, which causes a counter in a bin corresponding to a slug to be incremented. After completion of step 206, bins whose counters have a value greater than one reflect one or more matching slugs. Some of these matches, however, may be false positive matches rather than true matches. Therefore, steps 208 and 210 filter out the false positive matches through use of a multimap.

In step 208, for slugs associated with bins in the counting Bloom filter whose counters have a value greater than 1, the slug and its associated object are added to a multimap. When adding the slug and its corresponding object to the multimap, the slug represents the key to the multimap and the object in the corpus represents the value to the multimap. This multimap will be utilized to remove false positives from processing. In step 210, the process 200 concludes by outputting a value for any key in the multimap that has two or more values. The outputted values reflect objects whose slugs matched slugs of at least one other object in the corpus. Thus, the objects outputted identify objects whose selected properties, as reflected in an object's slug, unambiguously match at least one other object in the corpus.

In some embodiments, process 200 may be distributed across multiple processors. For example, a counting Bloom filter may exist on each of several processors and steps 202, 204, and 206 can be executed on each of the several processors. The corpus of objects may be distributed among the various processors so that all objects are processed by one processor, but no object is processed by more than one processor. In such embodiments, prior to executing step 208, counters for each bin in the counting Bloom filter are summed together with counters for the same bin in counting Bloom filters on other processors. Thereafter, process 200 continues by executing steps 208 and 210 on a single processor.

Exemplary embodiments will now be described that solve the third problem discussed above, i.e., efficiently identifying unique objects in a corpus. These embodiments utilize a counting Bloom filter and a multimap to quickly identify unique objects. Upon inputting slugs for all objects in the corpus into the counting Bloom filter, any bin with a count value of one reflects a unique object because Bloom filters do not generate false negatives. Additionally, to the extent that bins have count values of two or more, those count values could reflect false positives. Therefore, a multimap allows a determination of whether the matches reflected in the count values were false or true positives.

Figure 3:
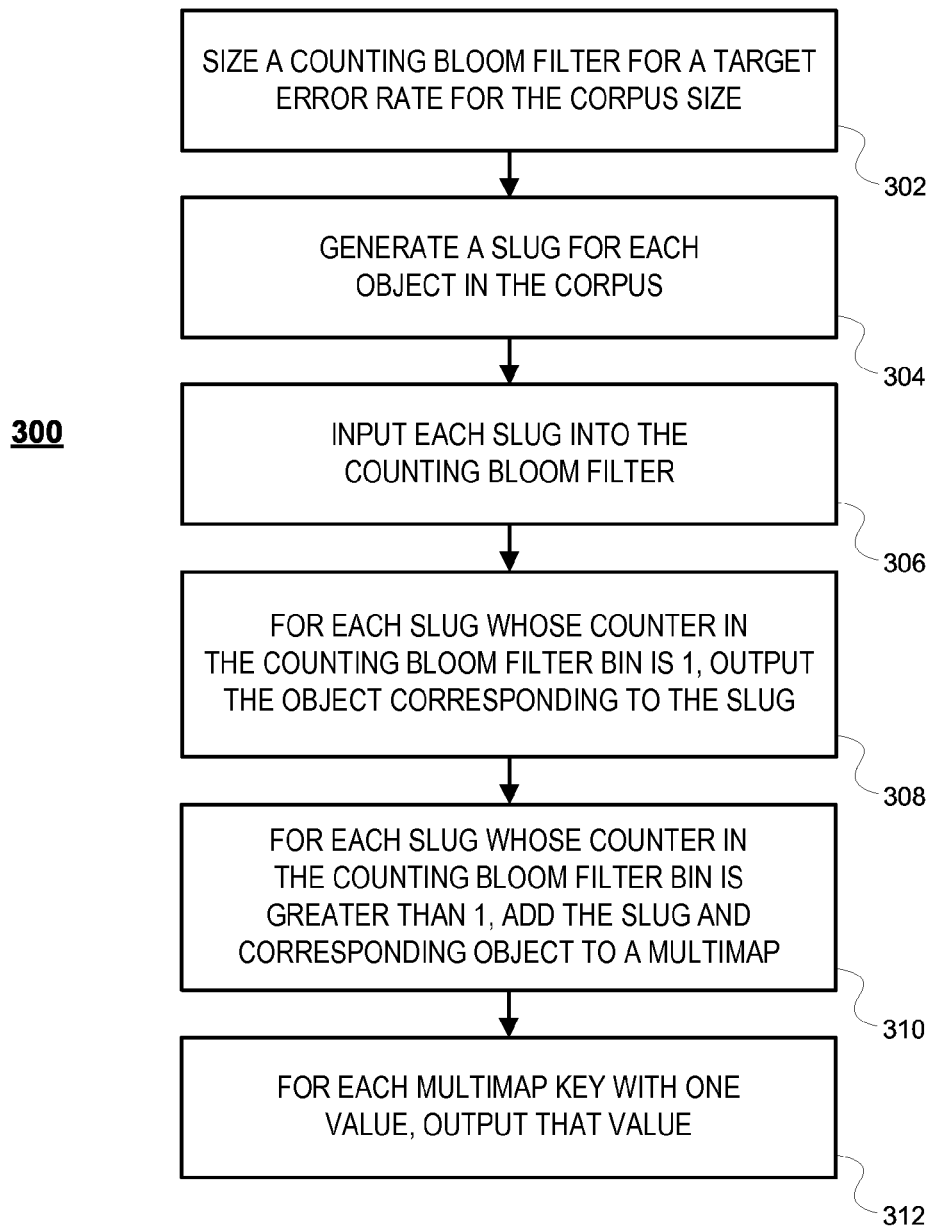
FIG. 3 illustrates a flowchart of an exemplary process for comparing all objects in a corpus to all other objects in the corpus, to determine unique objects within the corpus, consistent with some embodiments of the present disclosure.

FIG. 3 illustrates a flowchart of an exemplary process 300 for comparing all objects in a corpus to all other objects in the corpus, to determine unique objects within the corpus, consistent with some embodiments of the present disclosure. As illustrated, in step 302, a counting Bloom filter is sized and created with consideration for the error rate that will result for the corpus size that is being processed. For example, increasing the number of bins in a counting Bloom filter may tend to decrease the error rate for a specific corpus size while reducing the number of bins in a counting Bloom filter may tend to increase the error rate for a specific corpus size. Techniques for sizing a counting Bloom filter to achieve a target error rate for a specific corpus size are well known so these techniques are not discussed herein.

In some embodiments, the counting Bloom filter may comprise an N-bit counter and these counters may be implemented as two-bit counters (i.e., N=2). In other embodiments, these counters may be one-bit counters or counters of more than two bits. In additional embodiments, these counters are saturation counters; i.e., these counters will count up to a maximum value and then not exceed that value.

In step 304, a slug for each object in the corpus is generated. In step 306, each slug is input to the counting Bloom filter, which causes a counter in a bin corresponding to the slug to be incremented. As previously discussed, after slugs for all objects in the corpus have been input to the counting Bloom filter, any bin with a count value of one reflects a unique object within the corpus because the counting Bloom filter does not generate false negatives. Therefore, in step 308, for each slug whose counter in the counting Bloom filter is one, the slug's corresponding object is output as a unique object within the corpus.

After completion of step 308, bins whose counters have a value greater than one reflect one or more matching slugs; i.e., slugs that are not unique. Some of these matches, however, may be false positive matches rather than true matches due to the nature of Bloom filters, as discussed above. Therefore, steps 310 and 312 filter out the false positive matches through use of a multimap.

Steps 310 and 312 determine whether the counting Bloom filter is masking the existence of other unique objects because the Bloom filter allows for false positives. In step 310, for each slug whose associated bin has a counter value greater than one, the slug is input as a key to a multimap and the object corresponding to the slug is input as a value for that key. In step 312, the process terminates after outputting each value in the multimap for keys that have only one value. Unique objects within the corpus are reflected by the collection of objects output from step 308 and the collection of objects output by step 312 because the former reflects objects whose slugs were the only slug in a counting Bloom filter's bin and were therefore unique among slugs associated with objects in the corpus while the latter reflects slugs that were false positives within the counting Bloom filter but were disambiguated by the multimap.

In some embodiments, process 300 may be distributed across multiple processors. For example, a counting Bloom filter may exist on each of several processors and steps 302, 304, and 306 can be executed on each of several processors. The corpus of objects may be distributed among the various processors so that all objects are processed by one processor, but no object is processed by more than one processor. In such embodiments, prior to executing step 308, counters for each bin in the counting Bloom filter are summed together with counters for the same bin in counting Bloom filters on other processors. Thereafter, process 300 continues by executing steps 308, 310, and 312 on a single processor.

Figure 4:
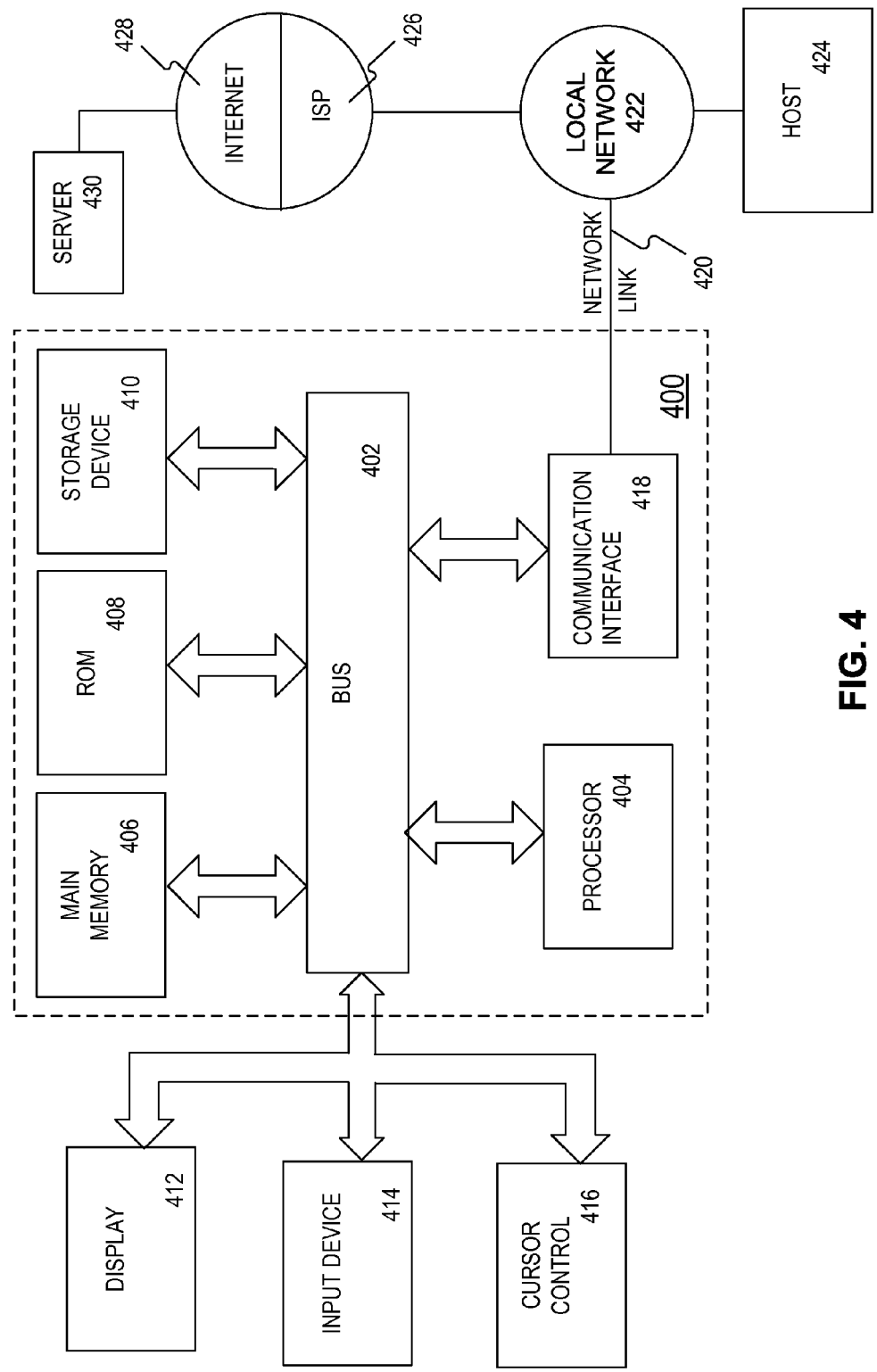
FIG. 4 illustrates an exemplary computing environment within which embodiments of the present disclosure can be implemented.

FIG. 4 illustrates an exemplary computing environment within which the embodiments of the present disclosure can be implemented.

Computer system 400 includes a bus 402 or other communication mechanism for communicating information, and a hardware processor 404 coupled with bus 402 for processing information. In some embodiments, hardware processor 404 can be, for example, a general-purpose microprocessor or it can be a reduced instruction set microprocessor.

Computer system 400 also includes a main memory 406, such as a random access memory (RAM) or other dynamic storage device, coupled to bus 402 for storing information and instructions to be executed by processor 404. Main memory 406 also can be used for storing temporary variables or other intermediate information during execution of instructions by processor 404. Such instructions, when stored in non-transitory storage media accessible to processor 404, render computer system 400 into a special-purpose machine that is customized to perform the operations specified in the instructions.

In some embodiments, computer system 400 further includes a read only memory (ROM) 408 or other static storage device coupled to bus 402 for storing static information and instructions for processor 404. A storage device 410, such as a magnetic disk or optical disk, is provided and coupled to bus 402 for storing information and instructions.

Computer system 400 can be coupled via bus 402 to a display 412, such as a cathode ray tube (CRT) or LCD panel, for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. The input device typically has degrees of freedom in two axes, a first axis (for example, x) and a second axis (for example, y), that allows the device to specify positions in a plane.

Computer system 400 can implement the processes and techniques described herein using customized hard-wired logic, one or more ASICs or FPGAs, firmware and/or program logic which in combination with the computer system causes or programs computer system 400 to be a special-purpose machine. In some embodiments, the processes and techniques herein are performed by computer system 400 in response to processor 404 executing one or more sequences of one or more instructions contained in main memory 406. Such instructions can be read into main memory 406 from another storage medium, such as storage device 410. Execution of the sequences of instructions contained in main memory 406 causes processor 404 to perform the process steps described herein. In other embodiments, hard-wired circuitry can be used in place of or in combination with software instructions.

The term "storage media" as used herein refers to any non-transitory media that store data and/or instructions that cause a machine to operate in a specific manner. Such storage media can comprise non-volatile media and/or volatile media. Non-volatile media includes, for example, optical or magnetic disks, such as storage device 410. Volatile media includes dynamic memory, such as main memory 406. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but can be used in conjunction with transmission media. Transmission media participates in transferring information between storage media. For example, transmission media includes coaxial cables, copper wire and fiber optics, including the wires that comprise bus 402. Transmission media can also take the form of acoustic or light waves, such as those generated during radio-wave and infra-red data communications.

Various forms of media can be involved in carrying one or more sequences of one or more instructions to processor 404 for execution. For example, the instructions can initially be carried on a magnetic disk or solid state drive of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 can optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 can be an integrated services digital network (ISDN) card, cable modem, satellite modem, or a modem to provide a data communication connection to a corresponding type of telephone line. As another example, communication interface 418 can be a local area network (LAN) card to provide a data communication connection to a compatible LAN. Wireless links can also be implemented. In any such implementation, communication interface 418 sends and receives electrical, electromagnetic or optical signals that carry digital data streams representing various types of information.

Network link 420 typically provides data communication through one or more networks to other data devices. For example, network link 420 can provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are example forms of transmission media.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418. The received code can be executed by processor 404 as it is received, and/or stored in storage device 410, or other non-volatile storage for later execution.

What is claimed is:

1. A method for identifying unique objects within a plurality of objects, each object comprising a first plurality of properties, each property comprising data reflecting a characteristic of an entity represented by the object, the method comprising the following operations performed by one or more processors:
   executing, for each object within the plurality of objects, the following:
      creating a slug for the object, the slug comprising a second plurality of properties from the object that includes at least some of the first plurality of properties; and
      inputting the slug for the object into a counting Bloom filter;
   identifying for each created slug whose corresponding bin within the counting Bloom filter has a count value equal to 1, the object associated with the slug as unique within the plurality of objects;
   inputting, using at least one processor, for each created slug, the slug and its corresponding object into a multimap, if a bin within the counting Bloom filter corresponding to the slug has a count value greater than 1, wherein the slug is a key to the multimap and the object is a value to the multimap; and
   identifying for each multimap key with one value, the object associated with the slug stored as the key as unique within the plurality of objects.

2. The method of claim 1, further comprising:
   sizing the counting Bloom filter for a predetermined error rate and number of objects within the plurality of objects.

3. The method of claim 2, further comprising:
   reading the plurality of objects from at least one database.

4. The method of claim 3, wherein each entry in the counting Bloom filter comprises a 2-bit counter.

5. The method of claim 4, wherein each 2-bit counter is a saturation counter.

6. The method of claim 5, wherein the number of properties in the first plurality of properties equals the number of properties in the second plurality of properties.

7. The method of claim 5, wherein the number of properties in the first plurality of properties is greater than the number of properties in the second plurality of properties.

8. The method of claim 1, wherein the slug comprises a concatenation of two or more strings separated by a delimiter between each concatenated string.

9. The method of claim 8, wherein the delimiter comprises a character that is not otherwise present in the strings that were concatenated.

10. The method of claim 8, wherein the delimiter comprises a sequence of two or more characters and the sequence of two or more characters is not present in any of the two or more strings that were concatenated.

11. A system for identifying unique objects within a plurality of objects, each object comprising a first plurality of properties, each property comprising data reflecting a characteristic of an entity represented by the object, the system comprising:
   a memory device that stores a set of instructions; and
   at least one processor that executes the set of instructions to perform the following operations:
   execute, for each object within the plurality of objects, the following:
      create a slug for the object, the slug comprising a second plurality of properties from the object that includes at least some of the first plurality of properties; and
      input the slug for the object into a counting Bloom filter;
   identify, for each created slug whose corresponding bin within the counting Bloom filter has a count value equal to 1, the object associated with the slug as unique within the plurality of objects;
   input, for each created slug, the slug and its corresponding object into a multimap, if a bin within the counting Bloom filter corresponding to the slug has a count value greater than 1, wherein the slug is a key to the multimap and the object is a value to the multimap; and
   identify, for each multimap key with one value, the object associated with the slug stored as the key as unique within the plurality of objects.

12. The system of claim 11, wherein the at least one processor further executes the set of instructions to perform the following operation:
   sizing the counting Bloom filter for a predetermined error rate and number of objects within the plurality of objects.

13. The system of claim 12, wherein the at least one processor further executes the set of instructions to perform the following operation:
   reading the plurality of objects from at least one database.

14. The system of claim 13, wherein each entry in the counting Bloom filter comprises a 2-bit counter.

15. The system of claim 14, wherein each 2-bit counter is a saturation counter.

16. The system of claim 15, wherein the slug comprises a concatenation of two or more strings separated by a delimiter between each concatenated string.

17. The system of claim 16, wherein the delimiter comprises a character that is not otherwise present in the strings that were concatenated.

18. The system of claim 16, wherein the delimiter comprises a sequence of two or more characters and the sequence of two or more characters is not present in any of the two or more strings that were concatenated.

19. The system of claim 16, wherein the number of properties in the first plurality of properties equals the number of properties in the second plurality of properties.

20. The system of claim 16, wherein the number of properties in the first plurality of properties is greater than the number of properties in the second plurality of properties.

* * * * *